(12) United States Patent  (10) Patent No.: US 7,878,061 B2
Classen et al.  (45) Date of Patent: Feb. 1, 2011

(54) MICROMECHANICAL SYSTEM INCLUDING A SUSPENSION AND AN ELECTRODE POSITIONED MOVABLY

(75) Inventors: Johannes Classen, Reutlingen (DE);
Arnd Kaelberer, Schlierbach (DE);
Patrick Wellner, Stuttgart (DE);
Dietrich Schubert, Reutlingen (DE);
Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/323,653

(22) Filed: Nov. 26, 2008

(65) Prior Publication Data

US 2009/0152654 A1 Jun. 18, 2009

(30) Foreign Application Priority Data

Dec. 18, 2007 (DE) .............. 10 2007 060 878

(51) Int. Cl.
*H01L 21/76* (2006.01)
(52) U.S. Cl. ................... 73/514.38; 257/415
(58) Field of Classification Search .......... 73/514.38; 257/415, E29.324, E21.001
See application file for complete search history.

(56) References Cited

U.S. PATENT DOCUMENTS 5,211,051 A * 5/1993 Kaiser et al. ............... 73/1.38

FOREIGN PATENT DOCUMENTS

EP 0 773 443 5/1997
JP 2005-249454 A1 * 9/2005

OTHER PUBLICATIONS

Stanley Wolf Ph.D. and Richard N. Tauber Ph.D. in Silicon Processing for the VLSI Era, vol. 1: Process Technology, Lattice Press, 1986, pp. 198-200.*

* cited by examiner

*Primary Examiner*—William M. Brewster
(74) *Attorney, Agent, or Firm*—Kenyon & Kenyon LLP

(57) ABSTRACT

A micromechanical system includes a substrate, a first planar electrode, a second planar electrode, and a third planar electrode. The second planar electrode is movably positioned at a distance above the first planar electrode and the third planar electrode is positioned at a distance above the second electrode.

11 Claims, 5 Drawing Sheets

MICROMECHANICAL SYSTEM INCLUDING A SUSPENSION AND AN ELECTRODE POSITIONED MOVABLY

FIELD OF THE INVENTION

The present invention relates to a micromechanical system and a method for producing a micromechanical system.

BACKGROUND INFORMATION

Micromechanical systems have broad application, these days, in air bags in motor vehicles or in computer hard disks. So-called acceleration sensors are implemented as micromechanical systems for the former. As a common and reliable representative of a micromechanical acceleration sensor one might name, for example, a capacitive differential sensor having an asymmetrical tilting oscillator. When an acceleration or a force appears, the oscillator is deflected in the manner of a tilting motion, which on one side of the suspension of the tilting oscillator leads to an approach towards a substrate, and on the other side of the suspension leads to a distancing of the tilting oscillator from the substrate. If the tilting oscillator and the substrate form a capacitor, the corresponding capacitance is increased on one side of the suspension, while the capacitance on the other side is simultaneously lowered. This may be utilized to provide increased reliability and readout certainty in situations where the tilting oscillator is used. Thus, European Patent No. EP 0 773 443 describes such a micromechanical acceleration sensor having an asymmetrical tilting oscillator.

Micromechanical systems are usually produced with the aid of lithography methods, patterning methods and etching methods from layer systems on a substrate. In a conventional sacrificial layer process, a buried sacrificial layer is etched selectively in order to expose a self-supporting pattern of a layer that is situated on the sacrificial layer. However, in the production of asymmetrical oscillators, vertical oscillators or other oscillator topologies using these established processes, difficulties may occur or the production of particular patterns may even be impossible using these methods.

SUMMARY OF THE INVENTION

It is therefore an objective of the present invention to provide an improved micromechanical system which, on the one hand, makes a vertical construction of a capacitive differential acceleration sensor possible and, on the other hand, is able to be produced in a multilayer system using a usual and established method. It is also an objective of the present invention to provide an improved method for producing a micromechanical system corresponding to the above.

According to a first aspect of the present invention, a first, a second and a third planar electrode are provided one above another on a substrate. The second planar electrode, in this instance, is able to move back and forth between the first and third planar electrode in response to the appearance of an acceleration and/or a force. If the second planar electrode moves in the direction of the first planar electrode, a first capacitance between the first and the second planar electrode is increased, while a second capacitance between the second planar electrode and the third planar electrode is decreased. The increase in the first capacitance, on the one hand, and the decrease in the second capacitance, on the other hand, are functions of each other, so that, because of the vertical construction of the motion sensor, a differential acceleration sensor is able to be implemented in an advantageous manner.

According to one specific embodiment of the present invention, the micromechanical system is implemented in a multilayer system. Such a multilayer system is able to have a first and a second functional layer on the substrate, under which a sacrificial layer is situated in each case. Consequently, the system can also be produced, having a vertical construction, by a sacrificial layer process, or rather by selective etching. Accordingly, the second planar electrode may further be patterned together with a suspension of the second electrode and a base, in one piece, in the second functional layer. Furthermore, the first planar electrode may be formed in a conductive region of the substrate. Thus, additional functional layers and/or sacrificial layers need not be provided. Furthermore, the first planar electrode may be formed in an additional functional layer on an additional sacrificial layer. The first planar electrode thus may be electrically insulated from the substrate and additional electrical units, such as supply leads, may be implemented in the additional functional layer.

Moreover, an additional mass on the second planar electrode is able to increase the deflection of the electrode at a constant force, and consequently substantially improve the sensitivity and/or the reliability of the system in an advantageous manner. The additional mass, in this context, may be situated on the second planar electrode, may be formed from the same material as the second functional layer and may be connected to the material of the first functional layer. Consequently, providing or depositing the additional mass may take place in one step together with providing or depositing of the second functional layer. According to another specific embodiment, a slot opening is advantageously able to decouple the third electrode from a rest of the second functional layer electrically or mechanically.

According to a second aspect of the present invention, a method for producing a micromechanical system in a multilayer system having at least one first and one second functional layer, and one first and second sacrificial layer on a substrate, is provided.

DETAILED DESCRIPTION

Figure 1A:
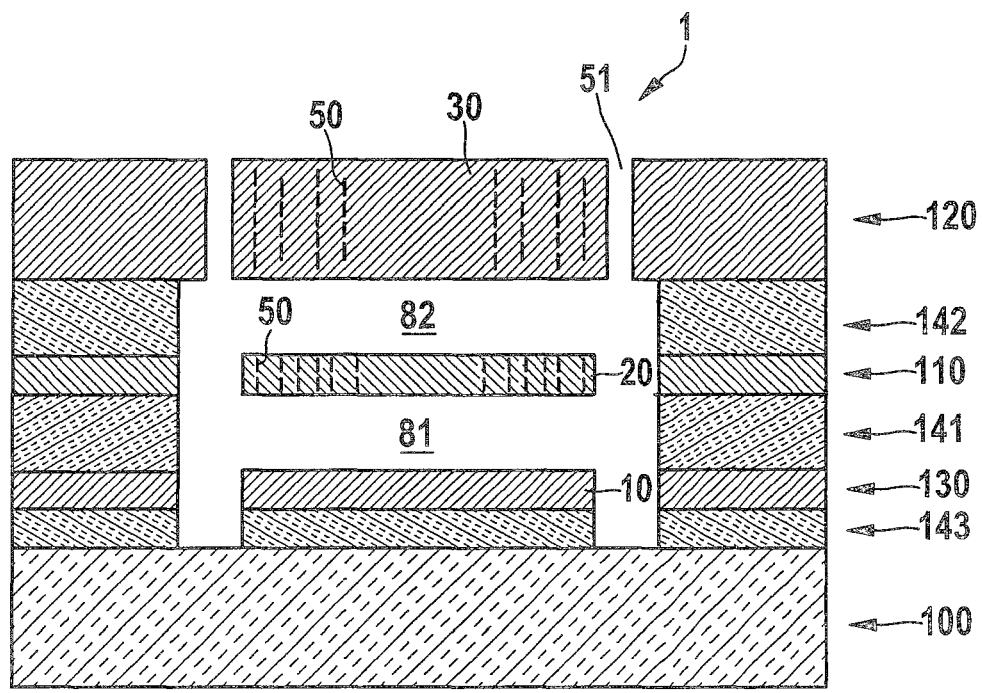
FIG. 1a shows a schematic view of a micromechanical system according to a first specific embodiment of the present invention.

FIG. 1a shows a schematic sectional view of a micromechanical system according to a first specific embodiment of the present invention. Micromechanical system 1 includes a first planar electrode 10, a second planar electrode 20 and a third planar electrode 30. Second planar electrode 20, in this case, is patterned from a first functional layer 110, third planar electrode 30 is patterned from a second functional layer 120 and first planar electrode 10 is patterned from an additional functional layer 130. Further, the additional functional layer 130 is situated on an additional sacrificial layer 143. The additional sacrificial layer 143 is situated on a substrate 100, which is able to act as carrier of micromechanical system 1. Between additional functional layer 130 and first functional layer 110, there is a first sacrificial layer 141, and between first functional layer 110 and second functional layer 120 there is a second sacrificial layer 142.

First and second sacrificial layers 141, 142 may be partially removed in order to mechanically expose layers or parts of layers situated on top of them, such as second planar electrode 20 and/or third planar electrode 30. A first capacitor gap 81 between first electrode 10 and second electrode 20 and a second capacitor gap 82 between second electrode 20 and third electrode 30, on the one hand, furnish a range of motion for second electrode 20 and, on the other hand, form a first capacitance between first electrode 10 and second electrode 20, and a second capacitance between second electrode 20 and third electrode 30.

Planar electrodes 10, 20, 30 may be developed as part of a layer, for instance, by patterning a conductive layer, or as a doped surface area of a layer. Thus, first planar electrode 10 may be developed by a doped or conductive area of additional functional layer 130, second planar electrode 20 may be developed by one or two doped or conductive areas of first functional layer 110, and third planar electrode 30 may be developed by a doped or conductive area of second functional layer 120.

According to this specific embodiment of the present invention, second planar electrode 20 is movable between first planar electrode 10 and third planar electrode 30. Between first planar electrode 10 and second planar electrode 20, a first electrical capacitance is thus developed, while between second electrode 20 and third electrode 30 a second electrical capacitance is developed. Consequently, a motion of second electrode 20 in the direction of third electrode 30 leads to an increase in the second capacitance, while this same motion leads to a diminution of the first capacitance. Thus, in an advantageous manner, a motion of second electrode 20 may be detected and/or read out by the simultaneous change of two capacitances, in the manner of a differential sensor.

The vertical construction of planar electrodes 10, 20, 30 may advantageously considerably increase the sensitivity and the accuracy of a sensor. Furthermore, the space required for implementing a differential capacitive acceleration sensor, for example, as compared to a tilting oscillator, may be advantageously reduced. On the one hand, this may lead to reduced production costs caused by a reduced usage of materials and/or process expenditure, and, on the other hand, it may lead to a diminution of the sensor element. The latter may advantageously spread the spectrum of utilization of acceleration sensors, for instance, in mobile applications.

Both second planar electrode 20 and third planar electrode 30 may have etching openings 50. In this context, etching openings 50 may be part of a perforation, that is, a multitude of etching openings 50 may be situated in a regular grouping. An etching medium, e.g. HF, is able to get through these very openings 50 for the purpose of selectively removing parts of first sacrificial layer 141, second sacrificial layer 142 and additional sacrificial layer 143. Thus second planar electrode 20 is able to be exposed between first electrode 10 and third electrode 30 in a vertical construction. Moreover, in second functional layer 120 a slot opening 51 may be provided in order to decouple, for example, third electrode 30 electrically and/or mechanically from micromechanical system 1. This slot opening 51 is able to surround third planar electrode 30 in a closed manner, and third planar electrode 30 is able to lie on second sacrificial layer 142 by way of a support pad, so as to carry third planar electrode 30.

According to this specific embodiment, first planar electrode 10 is produced in additional functional layer 130, which is separated from substrate 100 by additional sacrificial layer 143. Thus electrode 10 is advantageously able to be decoupled electrically from substrate 100. Besides that, additional electrical and/or mechanical units, such as supply leads to the electrodes, are able to be implemented in additional functional layer 130.

Figure 1B:
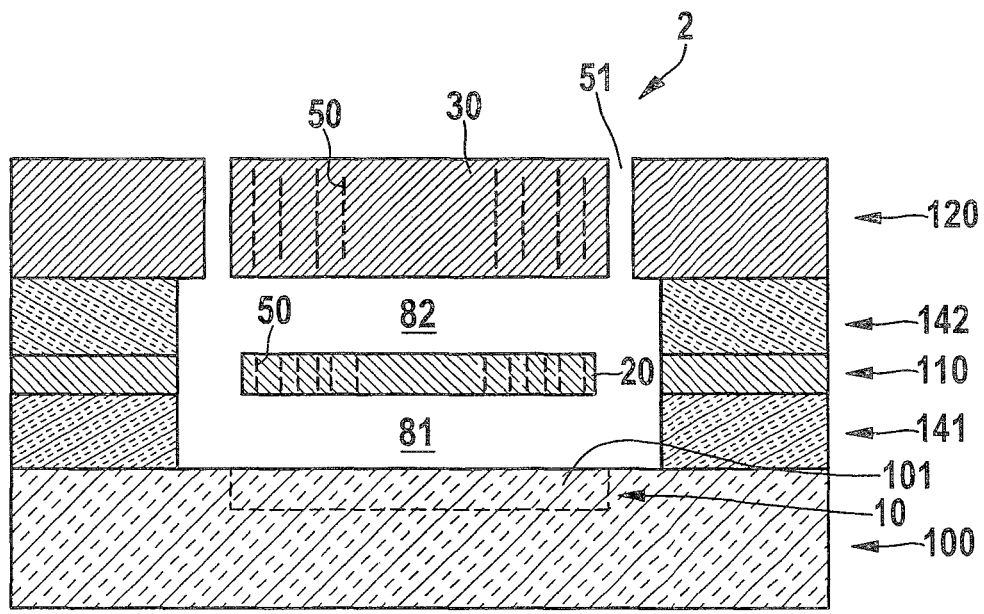
FIG. 1b shows a schematic view of a micromechanical system according to a second specific embodiment of the present invention.

FIG. 1b shows a schematic sectional view of a micromechanical system according to a second specific embodiment of the present invention. As a modification of micromechanical system 1 described above, according to this specific embodiment, in a micromechanical system 2, first planar electrode 10 is formed in substrate 100. For this purpose, a region 101 of substrate 100 may be made conductive, for instance, by an appropriate doping. Moreover, conductive region 101 is able to include the whole of substrate 100. The contacting of first planar electrode 10 in the appropriate use of a conductive substrate may be accomplished, for example, by a backside substrate contact. According to this specific embodiment, additional functional layers and sacrificial layers may be omitted, which is able to simplify its production substantially.

Figure 1C:
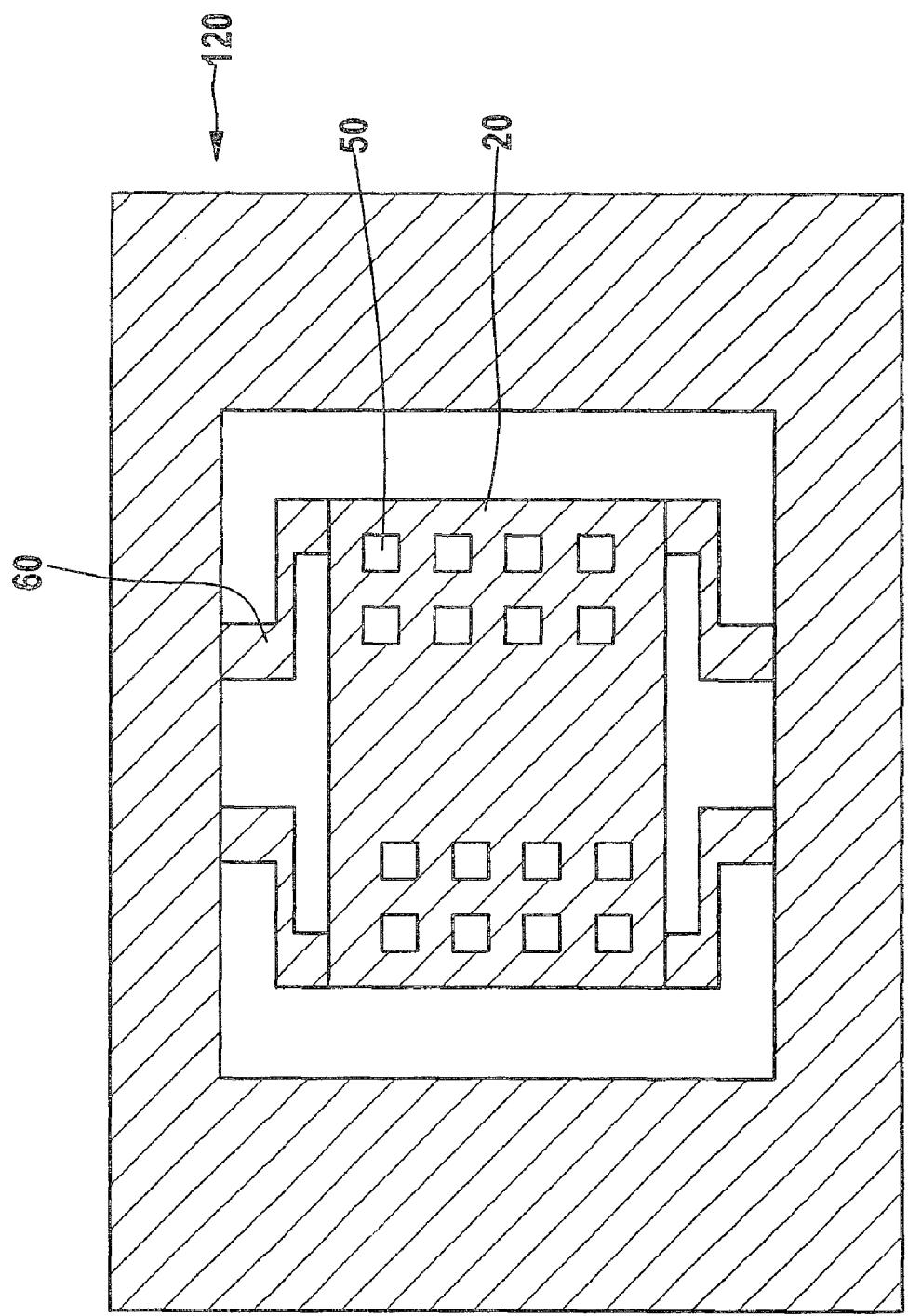
FIG. 1c shows a top view of a cut-out from the micromechanical systems of FIGS. 1a and 1b.

FIG. 1c shows a top view of a cut-out from micromechanical systems 1 and 2. Only the portion of first functional layer 110 is shown in which second planar electrode 20 is produced. In this instance, second planar electrode 20 is movably connected to the rest of second layer 120 by a suspension 60. Suspension 60 may have elastic and/or flexible mechanical properties, in order, for example, to support second planar electrode 20 as a seismic mass within the meaning of a springy suspension having a restoring force.

The first, second and third electrode 10, 20, 30 are surrounded by a frame, preferably a closed frame. The frame is formed by a layer construction which has the first, second and an additional functional layer 110, 120, 130. The frame has a closed shape, for instance, as is illustrated in FIG. 1c for second layer 120. The frame forms a mechanical protection for electrodes 10, 20, 30.

Figure 2A:
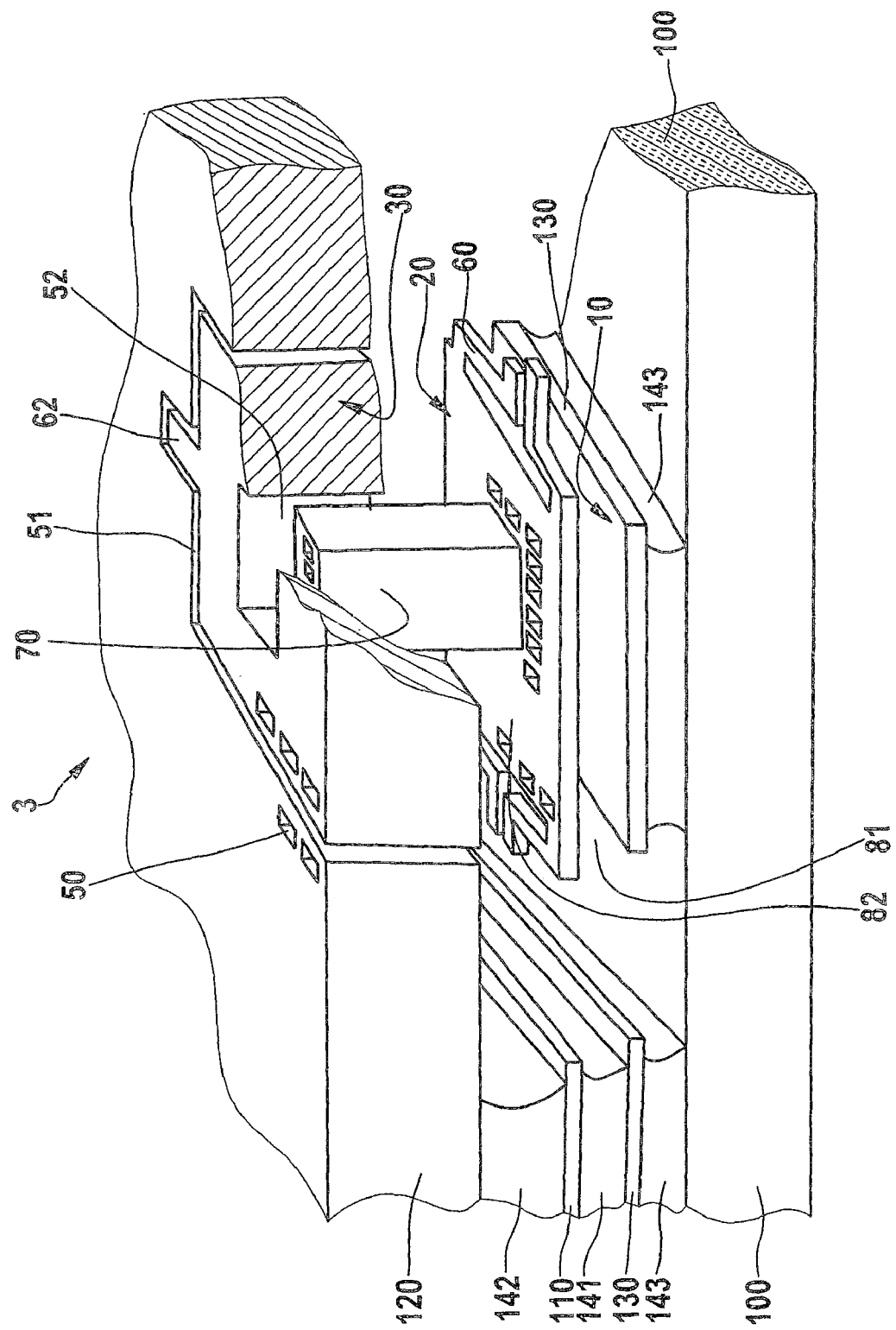
FIGS. 2a, 2b and 2c show schematic views of a micromechanical system according to a third specific embodiment of the present invention.

FIG. 2a shows a schematic elevation view of a micromechanical system according to a third specific embodiment of the present invention. A third micromechanical system 3 is produced according to this illustration in a layer construction on substrate 100. The layer construction has an additional sacrificial layer 143, additional functional layer 130, first sacrificial layer 141, first functional layer 110, second sacrificial layer 142 and second functional layer 120. Accordingly, first planar electrode 10 is situated in additional functional layer 130 on additional sacrificial layer 143, electrically insulated on substrate 100. Second planar electrode 20 is situated movably above first electrode 10. Second planar electrode 20, in this instance, may be supported movably and/or flexibly on the rest of layer 110 by suspensions 60, which may be part of first functional layer 110.

Third planar electrode 30 is produced over second planar electrode 20 in second functional layer 120. Third planar electrode 30 may further be electrically and/or mechanically decoupled from the rest of layer 120 by slot opening 51. Third planar electrode 30 also has an additional suspension 62, which lies at least partially on second sacrificial layer 142, and thus carries electrode 30. Furthermore, during production, in an area of suspension 62, openings may be provided in second sacrificial layer 142, in first functional layer 110 and in first sacrificial layer 141, which are filled up with a conductive material, so as to provide an electrical contacting to third planar electrode 30. Silicon or the material of second functional layer 120 may be used as the filling material. Thus, the provision of the second functional layer 120 and the contacting of third electrode 30 may advantageously take place in one production step. The contacting may be continued in a supply lead patterned in the additional functional layer 130.

Both second functional layer 120 and first functional layer 110 may have etching openings 50, for example, part of a perforation, in order to make possible the access to the sacrificial layers, such as first sacrificial layer 141, second sacrificial layer 142 and additional sacrificial layer 143.

According to this specific embodiment of the present invention, an additional mass 70 is furthermore situated on second planar electrode 20. Additional mass 70 may be column-shaped, as shown here, and be particularly patterned from a part of third layer 130. Alternatively, additional mass 70 may also be positioned under second planar electrode 20. Furthermore, in another embodiment, an additional mass may be provided both on second planar electrode 20 as well as under electrode 20. For this purpose, an additional slot opening 52 is provided in second functional layer 120, in order thus to fasten additional mass 70 movably on second planar electrode 20. The fixing of additional mass 70 to second planar electrode 20 may be enabled by adhesion forces and/or additional patterning methods and/or production methods. Furthermore, in second functional layer 120, an opening may also be provided in the area of slot opening 52, and additional mass 70 may be deposited by deposition of a material, for instance silicon, on second planar electrode 20.

Thus, the deflection of second planar electrode 20 may be advantageously magnified at a given acceleration and or force. This results in an increased differential change in the first capacitance and the second capacitance, which may be utilized to increase readout accuracy or triggering reliability.

According to further specific embodiments of the present invention, substrate 100, first functional layer 110, second functional layer 120 and third functional layer 130 may have silicon and/or polycrystalline silicon. The polycrystalline silicon may be applied, e.g., epitaxially as epitaxial polycrystalline silicon. First sacrificial layer 141, second sacrificial layer 142 and additional sacrificial layer 143 may also have silicon dioxide. Consequently, the parts of sacrificial layers 141, 142, 143 may be removed selectively by well-established and reproducible selective etching methods, whereas the patternings in the silicon layers, such as in the first, second and additional functional layers 110, 120, 130 remain intact. The patterning of the first, second and additional functional layers 110, 120, 130, for instance, for implementing electrodes 10, 20, 30, etching openings 50, slot opening 51 and/or additional slot opening 52, may be accomplished using anisotropic plasma methods and/or ion-supported etching methods, such as reactive ion etching (RIE). Furthermore, first functional layer 110 and or second functional layer 120 may include doped areas, in order to provide for second electrode 20 and/or third electrode 30, for example, as areas of increased conductivity.

Figure 2B:
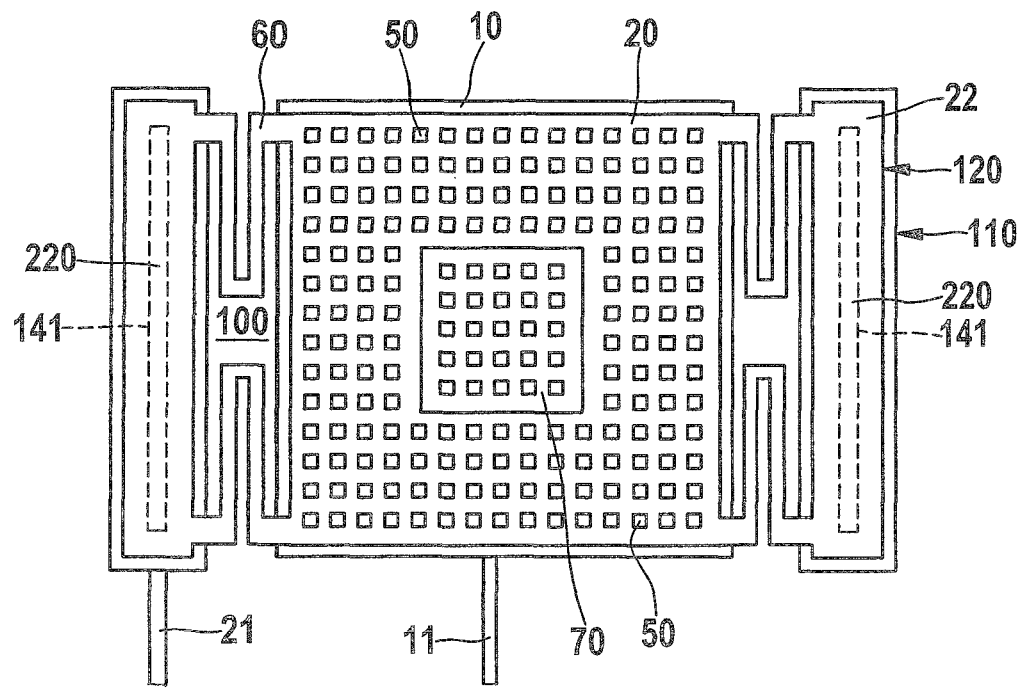

FIG. 2b shows a schematic top view onto first planar electrode 10 and second planar electrode 20 according to the third specific embodiment of the present invention. Together with suspension 60 and a base 22, second planar electrode 20 is patterned or carved out in one part from first functional layer 110. In an area under base 22, one part of first sacrificial layer 141 which has remained during production, mechanically binds the second planar electrode, together with suspension 60, to the subjacent layers, and thus also to substrate 100. Supply leads 11, 21 may be patterned in additional functional layer 130 and/or first functional layer 110, so as to provide contacting of first and second planar electrodes 10, 20. For example, first sacrificial layer 141 may have an opening 220 which, by being filled with a conductive material, such as the material of first functional layer 110, makes possible the contacting of second planar electrode 20 via additional functional layer 130. Additional mass 70 is furthermore situated on second electrode 20.

Figure 2C:
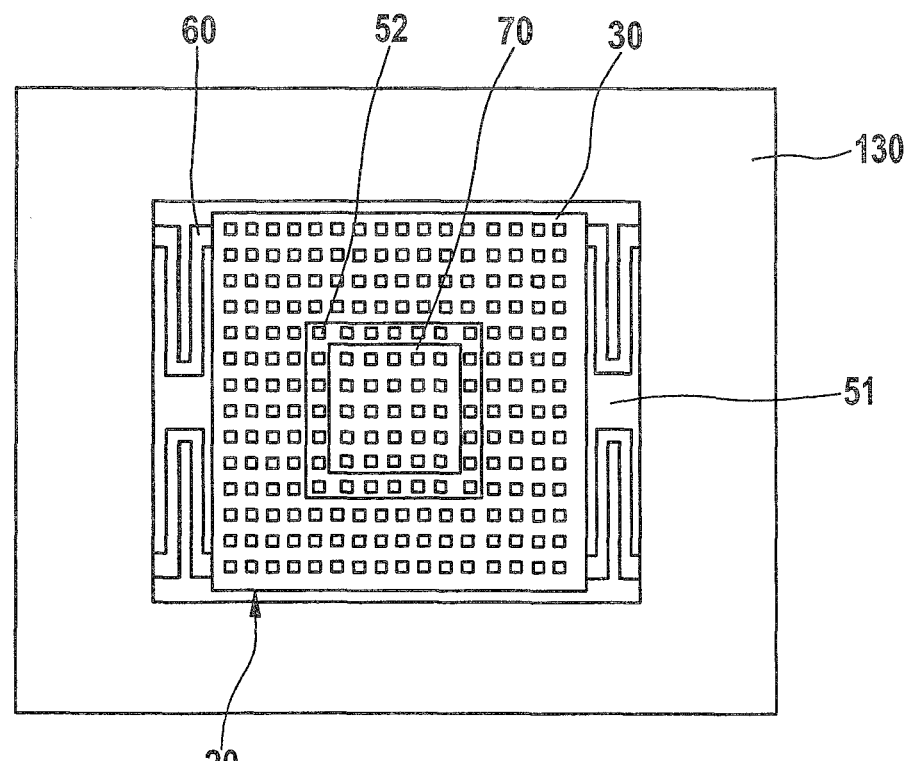

FIG. 2c shows a schematic top view onto second planar electrode 20 and second planar electrode 30 according to the third specific embodiment of the present invention. Third planar electrode 30 is patterned or carved out from second functional layer 120 together with additional mass 70. Additional mass 70 is thereby distanced by additional slot opening 52 from third electrode 30, while third electrode 30 is decoupled mechanically and/or electrically from the rest of functional layer 120 by slot opening 51.

Figure 3:
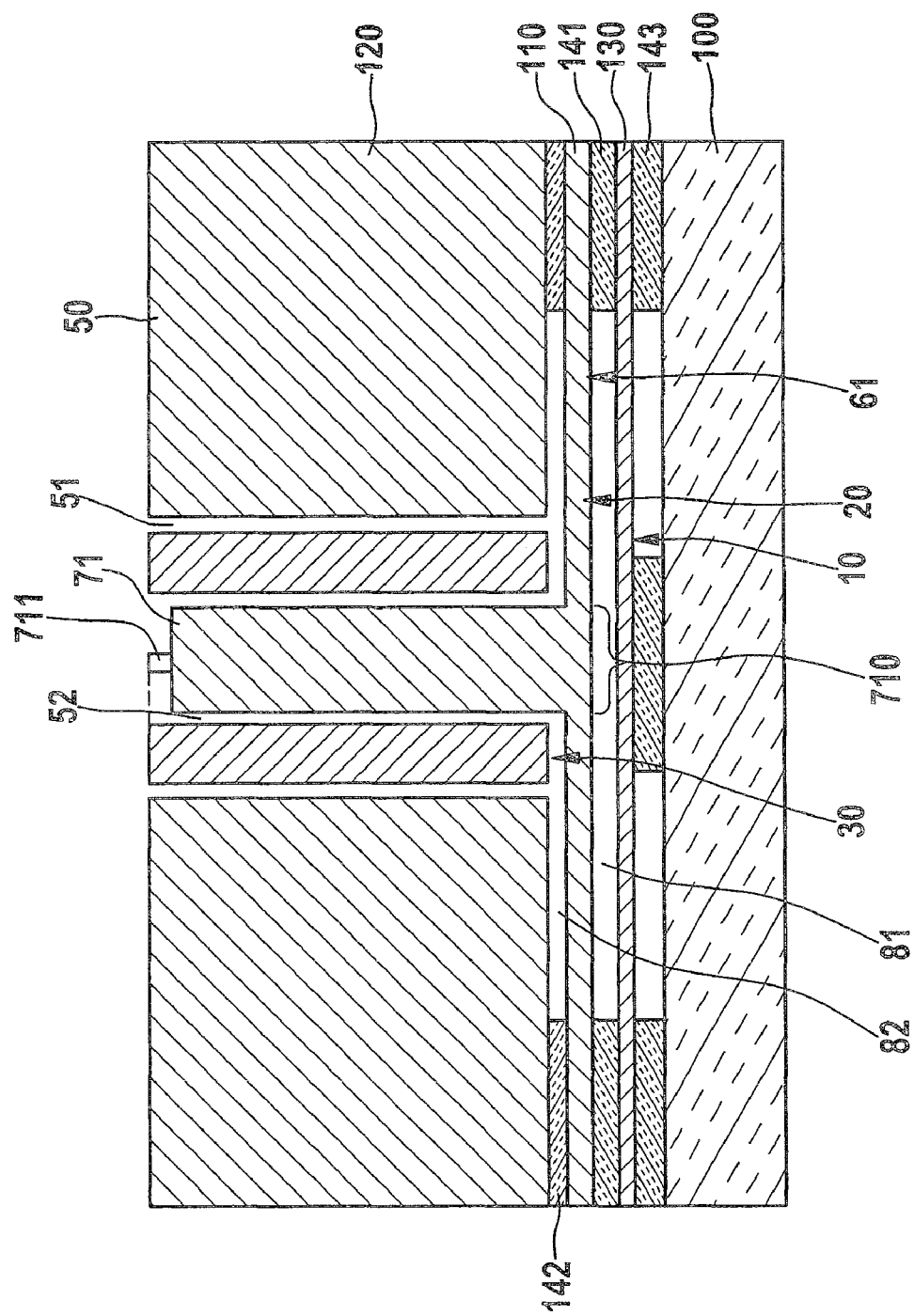
FIG. 3 shows a schematic view of a micromechanical system according to a fourth specific embodiment of the present invention.

FIG. 3 shows a schematic sectional view of a micromechanical system according to a fourth specific embodiment of the present invention. According to this, second planar electrode 20 is situated movably between first planar electrode 10 and third planar electrode 30. The movable positioning may take place by a suspension area 61, which is carved out in one piece or continuously with second planar electrode 20 from first functional layer 110. In a region of a first capacitor gap 81, the first sacrificial layer is removed, and in a region of a second capacitor gap 82, the second sacrificial layer is removed, and with that, second planar electrode 20 is suspended in a cantilevered manner.

According to this specific embodiment, an additional mass 71 is provided together with second functional layer 120, so that additional mass 71 and second functional layer 120 have the same material, such as silicon. For this purpose, before second functional layer 120 is deposited on second sacrificial layer 142, second sacrificial layer 142 is removed in a region of a base area 710 of additional mass 71. Consequently, in this region first functional layer 110 is accessible, and it may also have silicon in it. If the materials of first functional layer 110 and second functional layer 120 are able to be connected, as for instance in the case where they are identical, additional mass 71 is connected firmly to first functional layer 110 during depositing. Thereafter, the providing of slot opening 52 may take place in order to separate additional mass 71 from the rest of second functional layer 120 and to confer upon additional mass 71, together with second planar electrode 20, a mechanical degree of freedom. A difference in height of 711 between the surface of additional mass 71 and the surface of second functional layer 120 is able to result from this production method.

What is claimed is:
1. A micromechanical system, comprising:
a substrate;
a first planar electrode;
a second planar electrode positioned movably at a distance above the first planar electrode;
a third planar electrode positioned at a distance above the second planar electrode;
a first functional layer in which the second planar electrode, a suspension, and a base are patterned as and constitute one piece, the suspension spanning a distance between the second planar electrode and the base along the plane of the first functional layer, the suspension configured to act as a spring between the second planar electrode and the base;
a second functional layer in which the third planar electrode is patterned;

a first sacrificial layer situated between the substrate and the first functional layer; and a second sacrificial layer situated between the first functional layer and the second functional layer;

wherein the first sacrificial layer and the second sacrificial layer include silicon dioxide.

2. The system as recited in claim 1, wherein, within a region of the second planar electrode, the first sacrificial layer includes a first capacitor gap and the second sacrificial layer includes a second capacitor gap, the base being bound to the substrate with the aid of the first sacrificial layer.

3. The system as recited in claim 1, wherein the second functional layer includes a slot opening at least partially surrounding the third planar electrode.

4. The system as recited in claim 1, wherein an additional mass is situated on the second planar electrode.

5. The system as recited in claim 4, wherein the additional mass has a material of the second functional layer and is connected to the material of the first functional layer.

6. The system as recited in claim 5, wherein the second functional layer has an additional slot opening separating the additional mass from the second functional layer.

7. The system as recited in claim 1, wherein the substrate includes a conductive region which includes the first planar electrode.

8. The system as recited in claim 1, wherein an additional sacrificial layer and an additional functional layer are situated on the substrate, and the first planar electrode is patterned in the additional functional layer.

9. The system as recited in claim 1, wherein the second planar electrode is movably suspended using a spring structure.

10. The system as recited in claim 1, wherein the second planar electrode and the third planar electrode each include an etching opening.

11. The system as recited in claim 1, wherein the system is a part of a micromechanical acceleration sensor.

* * * * *